(12) United States Patent
Coulson

(10) Patent No.: US 8,945,478 B2
(45) Date of Patent: Feb. 3, 2015

(54) MICROFABRICATED DEVICES WITH COATED OR MODIFIED SURFACE AND METHOD OF MAKING SAME

(75) Inventor: Stephen Coulson, Abingdon (GB)

(73) Assignee: P2i Ltd., Abington, Oxfordshire (GB)

( * ) Notice: Subject to any disclaimer, the term of this patent is extended or adjusted under 35 U.S.C. 154(b) by 526 days.

(21) Appl. No.: 12/446,999

(22) PCT Filed: Oct. 24, 2007

(86) PCT No.: PCT/GB2007/003969
§ 371 (c)(1),
(2), (4) Date: Apr. 28, 2009

(87) PCT Pub. No.: WO2008/053150
PCT Pub. Date: May 8, 2008

(65) Prior Publication Data
US 2009/0304549 A1    Dec. 10, 2009

(30) Foreign Application Priority Data
Oct. 28, 2006   (GB) .................................. 0621520.6

(51) Int. Cl.
| | |
|---|---|
| *G01N 15/06* | (2006.01) |
| *G01N 33/00* | (2006.01) |
| *G01N 33/48* | (2006.01) |
| *C08F 220/24* | (2006.01) |
| *B01L 3/00* | (2006.01) |
| *B05D 1/00* | (2006.01) |
| *B05D 5/08* | (2006.01) |
| *C09D 4/00* | (2006.01) |

(52) U.S. Cl.
CPC ......... *C08F 220/24* (2013.01); *B01L 3/502707* (2013.01); *B05D 1/62* (2013.01); *B05D 5/083* (2013.01); *C09D 4/00* (2013.01); *B01L 2200/12* (2013.01); *B01L 2300/165* (2013.01)
USPC ............................ 422/503; 422/502; 422/504

(58) Field of Classification Search
USPC ......................................... 422/502, 503, 504
See application file for complete search history.

(56) References Cited

U.S. PATENT DOCUMENTS

| | | | |
|---|---|---|---|
| 6,329,024 B1 | 12/2001 | Timmons et al. | |
| 6,482,531 B1 | 11/2002 | Timmons et al. | |
| 6,551,950 B1 | 4/2003 | Badyal et al. | |
| 6,955,738 B2 | 10/2005 | Derand et al. | |
| 7,007,710 B2 * | 3/2006 | Heller et al. | ................ 137/15.01 |
| 2003/0118486 A1 * | 6/2003 | Zhou et al. | ..................... 422/102 |
| 2004/0121449 A1 | 6/2004 | Pugia et al. | |
| 2005/0003203 A1 | 1/2005 | Brown | |
| 2005/0237480 A1 * | 10/2005 | Allbritton et al. | ........ 351/160 R |
| 2006/0057209 A1 * | 3/2006 | Chapman et al. | ............. 424/486 |
| 2006/0166183 A1 | 7/2006 | Short et al. | |
| 2010/0234524 A1 | 9/2010 | Coulson | |

FOREIGN PATENT DOCUMENTS

| | | |
|---|---|---|
| CA | 2302118 A1 | 9/2000 |
| GB | 2341864 A | 12/1998 |
| GB | 2354249 A | 2/2000 |
| GB | 2427407 A | 9/2005 |
| JP | 2002-510363 A | 4/2002 |
| JP | 2003-230829 A | 8/2003 |
| JP | 2006-511809 A | 4/2006 |
| WO | WO-97/38801 A1 | 10/1997 |
| WO | WO-98/58117 A1 | 12/1998 |
| WO | WO-99/64662 A1 | 12/1999 |
| WO | WO-00/05000 A1 | 2/2000 |
| WO | WO 00/20130 A | 4/2000 |
| WO | WO-02/28548 A2 | 4/2002 |
| WO | WO-03/082483 A1 | 10/2003 |
| WO | WO-2004/105946 A2 | 12/2004 |
| WO | WO-2005/018787 A1 | 3/2005 |
| WO | WO-2005/089961 A1 | 9/2005 |
| WO | WO-2007021762 A2 | 2/2007 |
| WO | WO-2007083121 A1 | 7/2007 |
| WO | WO-2007124481 A2 | 11/2007 |

OTHER PUBLICATIONS

Wang, J., *Plasma Synthesis of a Novel CF$_3$-Dominated Fluorocarbon Film* (1996), 8, Chem. Mater., pp. 2212-2214.
Coulson, S., *Liquid Repellent Surfaces* (1999), Ph.D. Thesis, University of Durham.
Coulson, S. R. et al. Chem. Mater. 12(7), 2000, pp. 2031-2038 (abstract).
JPO Office action, JP 2009-533932, mailed Mar. 26, 2013, English translation.
Letter reporting Israeli Patent Office action, dated Jan. 16, 2013, in English.

* cited by examiner

*Primary Examiner* — Brian J Sines
(74) *Attorney, Agent, or Firm* — Mark E. Freeman

(57) ABSTRACT

A microfabricated device or component thereof, such as microfluidics or nanofluidics device having a uniform non-wetting or non-absorbing polymeric coating or surface modification formed on a surface thereof by ionization or activation technology such as plasma processing, to produce a surface energy of less than 15 mNm$^{-1}$. The treatment enhances the free-flowing properties of a liquid through the device during use.

20 Claims, No Drawings

MICROFABRICATED DEVICES WITH COATED OR MODIFIED SURFACE AND METHOD OF MAKING SAME

CROSS-REFERENCE TO RELATED APPLICATIONS

This application is a national stage application (under 35 U.S.C. §371) of PCT/GB2007/003969, filed Oct. 24, 2007, which claims benefit of British application 0621520,6, filed Oct. 28, 2006.

BACKGROUND

The present invention relates to microfabricated devices, in particular microfluidics or nanofluidics devices which are treated to provide a non-wetting, non-absorbing coating thereon, as well as to processes for their production.

Microfabrication techniques have long been used in the electronics industries to produce items such as integrated circuit boards or printed circuit boards (PCBs) for increasingly miniaturised electronic devices. These techniques are finding application in other areas of technology.

Nanotechnology is a fast growing area of technology in which materials and devices are designed, synthesised and characterised on a nanoscale for a wide variety of applications, for example in microelectronics, semiconductors, optoelectronics, medicine/pharmaceutical, diagnostics, catalysis, filtration, energy storage, within the chemical or nuclear industries etc.

Materials and devices classified as nanotechnology devices are usually less than 100 nanometers in size. They are generally produced in one of two basic ways, the first of which involves the careful construction of the device, molecule by molecule to achieve the desired structure. The second method involves the gradual stripping or etching of material from pre-existing structures, and is largely based upon pre-existing microfabrication technology, such as that used in conventional semiconductor art.

Microfluidic or nanofluidic devices are miniaturized devices with chambers and tunnels for the containment and flow of fluids.

Microfluidic devices may be defined as having one or more channels with at least one dimension less than 1 mm, whilst nanofluidic devices will have generally smaller channels. With devices measured at the micrometer level and fluids measured in nanoliters and picoliters, microfluidics devices are widely used for example in biotechnology or biochemistry.

These devices can be used to handle a wide variety of liquids sample types. However, they are particularly useful in biochemical research or diagnostics in particular clinical diagnostics, where they may be used to handle liquids such as blood samples (including whole blood or fractions such as blood plasma), bacterial cell suspensions, protein or antibody solutions and other reagents including organic solvents, buffers and salts. Depending upon the nature and arrangement of the microfluidic device, it can be used in a wide range of analytical techniques and methods including for example, the measurement of molecular diffusion coefficients, fluid viscosity, pH, chemical binding coefficients and enzyme reaction kinetics. Other applications for microfluidic devices include capillary electrophoresis, isoelectric focusing, immunoassays, flow cytometry, sample injection of proteins for analysis via mass spectrometry, amplification of nucleic acids for example using amplification reactions such as the polymerase chain reaction (PCR), DNA and protein analysis, cell manipulation, cell separation, cell patterning and chemical gradient formation, high through-put screening, micro chemical manufacture, cell based testing of drug candidates, patient monitoring, proteomics and genomics, chemical microreactions, protein crystallisation, drug delivery, scale-up to manufacturing of drugs, security and defense.

The use of microfluidic devices in carrying out biomedical research and analysis has a number of significant advantages. First, because the volume of fluids within these channels is very small, usually several nanoliters, the amount of reagents and analytes used is quite small. This is especially significant for expensive reagents or where reagents are scarce, for example in some diagnostic applications or forensic DNA analysis.

The fabrications techniques used to construct microfluidic devices can be relatively inexpensive and are very amenable both to highly elaborate, multiplexed devices and also to mass production. In a manner similar to that for microelectronics, microfluidic technologies enable the fabrication of highly integrated devices for performing several different functions on the same substrate chip. These devices can therefore give rise to the so-called "lab-on-a-chip" devices, which can be used as portable clinical diagnostic devices for use for example in doctors' surgeries or hospitals or even at home as a point-of-care device, reducing the need for laboratory analysis procedures.

Microfluidic devices can be fabricated from a variety of materials, such as silicon, glass, metals or polymers or mixtures of these using a variety of microfabrication techniques. The selection of the particular technique depends to a large extent upon the nature of the substrate material. Depending upon the intended use, the substrate may be required to be quite rigid or stiff, or have a particular resistance to chemicals or temperature cycling to ensure any necessary dimensional stability.

For example, the manufacture may be carried out by laying down a photoresist (positive or negative) onto a substrate and in particular a silicon substrate. The photoresist is exposed to UV light through a high-resolution mask with the desired device patterns, so as to allow polymerisation to occur in the exposed areas. Then excess unpolymerized photoresist is washed off and the substrate is placed in a wet chemical etching bath that anisotropically etches it in locations not protected by photoresist. The result is a substrate such as a silicon wafer in which microchannels are etched. A coverslip such as a glass coverslip for instance, is used to fully enclose the channels and holes are drilled in the glass to allow access to the microchannels for the sample.

Deep reactive ion etching (DRIE) may be used as an alternative to this type of wet chemical etching which is particularly useful when straighter edges and a deeper etch depth is required.

Thermosetting or other curable polymers may also be used to prepare microfluidic devices, by moulding methods. A particular example of such a polymer is the silicone polymer, polydimethylsiloxane (PDMS) but others as are conventional in the art may be employed. The polymer in liquid form is poured over or into a mould (usually silicon or photoresist) and cured to cross-link the polymer. PDMA produces an optically clear, relatively flexible material that can be stacked onto other cured polymer slabs to form complex three-dimensional geometries.

Alternatively, polymers or plastics can be subject to hot embossing techniques so as to imprint suitable patterns into the surface of the plastics. Injection moulding may be used to create complex structures.

Some microfluidic devices are prepared from layered polymeric sheets. Outlines of the microfluidic device are cut in thin sheets of optically transparent plastics such as Mylar™ with a laser cutting tool such as a carbon dioxide laser. The layers are bonded together with a thin adhesive layer to produce three-dimensional structures.

All these techniques are useful and so microfluidics is showing great promise in a variety of applications as outlined above.

However the small volumes involved mean that the liquids are prone to surface effects, and in particular wetting or adsorption within the channels. The devices are generally less sensitive than bulk tests, and are prone to failure if insufficient liquid is able to pass along the channels. However the varying nature of the substrates used in these devices means that it is difficult to ensure that this does not happen.

Techniques which have been used to address this problem include sputtering TEFLON®-like coatings onto the devices or using fluorinated silanes in their construction. However, these techniques present further complications such as poor adhesion quality, lack of durability and ineffective control of film thickness.

Ionisation techniques or activation techniques, where reactive atoms or molecules such as ions or free radicals are generated and contacted with surface have been used to modify surfaces. Examples of such techniques include plasma processing (including plasma deposition and plasma activation), neutron activation, e-beam or thermal ionisation techniques. They have been quite widely used for the deposition of polymeric coatings onto a range of surfaces, and in particular onto fabric surfaces.

Plasma polymerisation in particular is recognised as being a clean, dry techniques that generates little waste compared to conventional wet chemical methods. Using this method, plasmas are generally generated from organic molecules, which are subjected to an electrical field. When this is done in the presence of a substrate, the radicals of the compound in the plasma react on the substrate to form a polymer film.

Conventional polymer synthesis tends to produce structures containing repeat units that bear a strong resemblance to the monomer species, whereas a polymer network generated using a plasma can be extremely complex due to extensive monomer fragmentation. The properties of the resultant coating can depend upon the nature of the substrate as well as the nature of the monomer used and conditions under which it is deposited.

WO03/082483 describes the deposition of non-uniform plasma polymeric surfaces onto devices so as to achieve certain specific technical effects such as the control of local wettability, adhesion and frictional/wear characteristics.

Plasma deposition of a uniform polymeric coating onto microfabricated devices and in particular microfluidic or nanofluidic devices in order to reduce wetting generally and increase reliability has not previously been described. It is not clear therefore whether coatings applied in this way would be effective at eliminating adsorption problems at this level.

The present inventors have found that by subjecting at least the surfaces of a microfabricated device which come into contact with a liquid during use to a ionisation or activation means such as a plasma which causes modification of the surface to impart non-wetting properties, the reliability and robustness of the microfabricated device may be significantly enhanced.

SUMMARY OF THE INVENTION

According to one aspect, the invention provides apparatus selected from a microfabricated device or a component thereof wherein at least one surface thereof has a uniform non-wetting or non-absorbing coating or surface modification formed thereon by ionisation or activation technology, so as to produce surface energy value of less than 15 $mNm^{-1}$.

The ultra low surface energies achievable using these techniques can be less that 12 $mNm^{-1}$, for example from 8-10 $mNm^{-1}$ (where $mNm^{-1}$ is milliNewtons per meter).

In one embodiment, the ionisation or activation technology used is plasma processing. In particular the said surface of the microfabricated device or component has a uniform non-wetting or non-absorbing polymeric coating formed thereon by plasma deposition.

As used herein, the expression "microfabricated device" refers to any miniaturised device, or nanotechnological device, in particular microfluidic or nanofluidic devices, which have channels etc of less than 1 mm or 100 nanometers respectively. Suitably the surface of the microfabricated device or component, which has been treated so as to assume non-wetting or non-absorbing properties, is that which would, in use, come into contact with liquids. However, if convenient or required, additional surfaces or even the entire device may be so treated.

Treatment using the ionisation or activation techniques may be effected at any convenient stage of the preparation of the microfabricated device, so that either the device as a whole or individual components, elements or sub-assemblies of the device may be treated. For example, where channels have been etched into or otherwise formed in a substrate, the substrate may be subjected to the treatment, which produces a uniform coating over the entire substrate, and this ensures that the entire surface of the channels are suitably non-wetting or non-absorbing. Similarly, any cover plates or laminar materials used in the construction of the device may be treated before assembly. It will be appreciated that the formation of the polymeric layer on the surface of an element, component or sub assembly of the microfabricated device may occur before or after the element, component or sub-assembly is formed from a blank, and that therefore the term "element" as used herein includes blanks from which components may be produced. The applicants have found however that even when fully fabricated, exposure of the device to ionisation or activation techniques and in particular to plasma will allow monomer molecules and activated species to penetrate preformed channels and other complex three dimensional structures and become polymerised in situ on the surface of the channel.

Plasma processing to achieve non-wetting or non-absorbing properties may be achieved, for example, by exposing the surface to plasma comprising small molecules such as $CF_4$ and a variety of saturated and unsaturated hydrocarbon and fluorocarbon compounds (see, for example, "Plasma Polymerisation", Academic Press Inc. (London) Ltd. 1985). Longer chain semi and fully fluorinated compounds may also be used to impart non-wetting or non-absorbing properties.

Any monomeric compound or gas which undergoes plasma polymerisation or modification of the surface to form a non-wetting or non-absorbing, water-repellent polymeric coating layer or surface modification on the surface of the microfabricated device may suitably be used. Suitable monomers which may be used include those known in the art to be capable of producing water-repellent polymeric coatings on substrates by plasma polymerisation including, for example, carbonaceous compounds having reactive functional groups, particularly substantially —$CF_3$ dominated perfluoro compounds (see WO 97/38801), perfluorinated alkenes (Wang et al., Chem Mater 1996, 2212-2214), hydrogen containing unsaturated compounds optionally containing halogen atoms or perhalogenated organic compounds of at least 10 carbon atoms (see WO 98/58117), organic compounds comprising two double bonds (WO 99/64662), saturated organic compounds having an optionally substituted alkyl chain of at least 5 carbon atoms optionally interposed with a heteroatom (WO 00/05000), optionally substituted alkynes (WO 00/20130), polyether substituted alkenes (U.S. Pat. No. 6,482,531B) and macrocycles containing at least one heteroatom (U.S. Pat. No. 6,329,024B), the contents of all of which are herein incorporated by reference.

According to one embodiment, the invention provides a microfabricated device or component thereof having a polymeric coating, formed by exposing at least one surface of the device to plasma comprising a compound of formula (I)

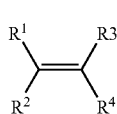
(I)

where $R^1$, $R^2$ and $R^3$ are independently selected from hydrogen, alkyl, haloalkyl or aryl optionally substituted by halo; and $R^4$ is a group —X—$R^5$ where $R^5$ is an alkyl or haloalkyl group and X is a bond; a group of formula —C(O)O—, a group of formula —C(O)O(CH$_2$)$_n$Y— where n is an integer of from 1 to 10 and Y is a sulphonamide group; or a group —(O)$_p$R$^6$(O)$_q$(CH$_2$)$_t$— where $R^6$ is aryl optionally substituted by halo, p is 0 or 1, q is 0 or 1 and t is 0 or an integer of from 1 to 10, provided that where q is 1, t is other than 0, for a sufficient period of time to allow a polymeric layer to form on the surface.

As used therein the term "halo" or "halogen" refers to fluorine, chlorine, bromine and iodine. Particularly preferred halo groups are fluoro. The term "aryl" refers to aromatic cyclic groups such as phenyl or naphthyl, in particular phenyl. The term "alkyl" refers to straight or branched chains of carbon atoms, suitably of up to 20 carbon atoms in length. The term "alkenyl" refers to straight or branched unsaturated chains suitably having from 2 to 20 carbon atoms. "Haloalkyl" refers to alkyl chains as defined above which include at least one halo substituent.

Suitable haloalkyl groups for $R^1$, $R^2$, $R^3$ and $R^5$ are fluoroalkyl groups. The alkyl chains may be straight or branched and may include cyclic moieties.

For $R^5$, the alkyl chains suitably comprise 2 or more carbon atoms, suitably from 2-20 carbon atoms and preferably from 4 to 12 carbon atoms.

For $R^1$, $R^2$ and $R^3$, alkyl chains are generally preferred to have from 1 to 6 carbon atoms.

Preferably $R^5$ is a haloalkyl, and more preferably a perhaloalkyl group, particularly a perfluoroalkyl group of formula $C_mF_{2m+1}$ where m is an integer of 1 or more, suitably from 1-20, and preferably from 4-12 such as 4, 6 or 8.

Suitable alkyl groups for $R^1$, $R^2$ and $R^3$ have from 1 to 6 carbon atoms.

In one embodiment, at least one of $R^1$, $R^2$ and $R^3$ is hydrogen. In a particular embodiment $R^1$, $R^2$, $R^3$ are all hydrogen. In yet a further embodiment however $R^3$ is an alkyl group such as methyl or propyl.

Where X is a group —C(O)O(CH$_2$)$_n$Y—, n is an integer which provides a suitable spacer group. In particular, n is from 1 to 5, preferably about 2.

Suitable sulphonamide groups for Y include those of formula —N(R$^7$)SO$_2$— where $R^7$ is hydrogen or alkyl such as $C_{1-4}$alkyl, in particular methyl or ethyl.

In one embodiment, the compound of formula (I) is a compound of formula (II)

(II)

where $R^5$ is as defined above in relation to formula (I).

In compounds of formula (II), X in formula (I) is a bond.

However in a preferred embodiment, the compound of formula (I) is an acrylate of formula (III)

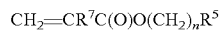
(III)

where n and $R^5$ as defined above in relation to formula (I) and $R^7$ is hydrogen, $C_{1-10}$ alkyl, or $C_{1-10}$haloalkyl. In particular $R^7$ is hydrogen or $C_{1-6}$alkyl such as methyl. A particular example of a compound of formula (III) is a compound of formula (IV)

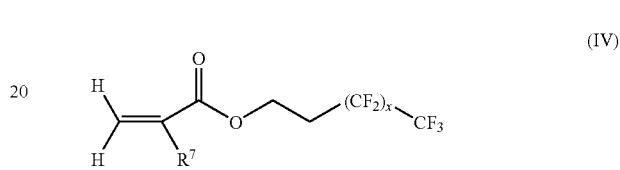
(IV)

where $R^7$ is as defined above, and in particular is hydrogen and x is an integer of from 1 to 9, for instance from 4 to 9, and preferably 7. In that case, the compound of formula (IV) is 1H,1H,2H,2H-heptadecafluorodecylacrylate.

According to another aspect, the polymeric coating is formed by exposing at least a surface of the microfabricated device to plasma comprising one or more organic monomeric compounds, at least one of which comprises two carbon-carbon double bonds for a sufficient period of time to allow a polymeric layer to form on the surface.

Suitably the compound with more than one double bond comprises a compound of formula (V)

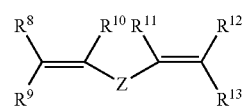
(V)

where $R^8$, $R^9$, $R^{10}$, $R^{11}$, $R^{12}$ and $R^{13}$ are all independently selected from hydrogen, halo, alkyl, haloalkyl or aryl optionally substituted by halo; and Z is a bridging group.

Examples of suitable bridging groups Z for use in the compound of formula (V) are those known in the polymer art. In particular they include optionally substituted alkyl groups which may be interposed with oxygen atoms. Suitable optional substituents for bridging groups Z include perhaloalkyl groups, in particular perfluoroalkyl groups.

In a particularly preferred embodiment, the bridging group Z includes one or more acyloxy or ester groups. In particular, the bridging group of formula Z is a group of sub-formula (VI)

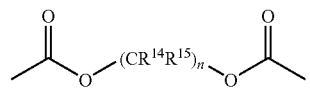
(VI)

where n is an integer of from 1 to 10, suitably from 1 to 3, each $R^{14}$ and $R^{15}$ is independently selected from hydrogen, alkyl or haloalkyl.

Suitably $R^8$, $R^9$, $R^{10}$, $R^{11}$, $R^{12}$, and $R^{13}$ are haloalkyl such as fluoroalkyl, or hydrogen. In particular they are all hydrogen.

Suitably the compound of formula (V) contains at least one haloalkyl group, preferably a perhaloalkyl group.

Particular examples of compounds of formula (V) include the following:

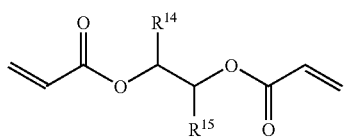

A where $R^{14}$ and $R^{15}$ are as defined above provided that at least one is other than hydrogen. A particular example is a compound of formula B.

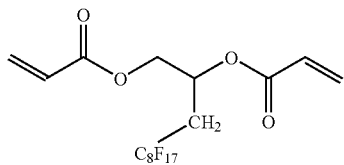

B

In a further aspect, the polymeric coating is formed by exposing at least a surface of the microfabricated device to plasma comprising a compound of comprising a monomeric saturated organic compound, said compound comprising an optionally substituted alkyl chain of at least 5 carbon atoms optionally interposed with a heteroatom for a sufficient period of time to allow a polymeric layer to form on the surface.

The term "saturated" as used herein means that the monomer does not contain multiple bonds (i.e. double or triple bonds) between two carbon atoms which are not part of an aromatic ring. The term "heteroatom" includes oxygen, sulphur, silicon or nitrogen atoms. Where the alkyl chain is interposed by a nitrogen atom, it will be substituted so as to form a secondary or tertiary amine. Similarly, silicons will be substituted appropriately, for example with two alkoxy groups.

Particularly suitable monomeric organic compounds are those of formula (VII)

(VII)

where $R^{16}$, $R^{17}$, $R^{18}$, $R^{19}$ and $R^{20}$ are independently selected from hydrogen, halogen, alkyl, haloalkyl or aryl optionally substituted by halo; and $R^{21}$ is a group $X$—$R^{22}$ where $R^{22}$ is an alkyl or haloalkyl group and X is a bond; a group of formula —C(O)O(CH$_2$)$_x$Y— where x is an integer from 1 to 10 and Y is a bond or a sulphonamide group; or a group —(O)$_p$R$^{23}$(O)$_s$(CH$_2$)$_t$— where $R^{23}$ is aryl optionally substituted by halo, p is 0 or 1, is 0 or 1 and t is 0 or an integer of from 1 to 10, provided that where s is 1, t is other than 0.

Suitable haloalkyl groups for $R^{16}$, $R^{17}$, $R^{18}R^{19}$, and $R^{20}$ are fluoroalkyl groups. The alkyl chains may be straight or branched and may include cyclic moieties and have, for example from 1 to 6 carbon atoms.

For $R^{22}$, the alkyl chains suitably comprise 1 or more carbon atoms, suitably from 1-20 carbon atoms and preferably from 6 to 12 carbon atoms.

Preferably $R^{22}$ is a haloalkyl, and more preferably a perhaloalkyl group, particularly a perfluoroalkyl group of formula $C_zF_{2z+1}$ where z is an integer of 1 or more, suitably from 1-20, and preferably from 6-12 such as 8 or 10.

Where X is a group —C(O)O(CH$_2$)$_y$Y—, y is an integer which provides a suitable spacer group. In particular, y is from 1 to 5, preferably about 2.

Suitable sulphonamide groups for Y include those of formula —N(R$^{23}$)SO$_2$— where $R^{23}$ is hydrogen, alkyl or haloalkyl such as $C_{1-4}$alkyl, in particular methyl or ethyl.

The monomeric compounds used in the method of the invention preferably comprises a $C_{6-25}$ alkane optionally substituted by halogen, in particular a perhaloalkane, and especially a perfluoroalkane.

According to another aspect, the polymeric coating is formed by exposing at least one surface of the microfabricated device to plasma comprising an optionally substituted alkyne for a sufficient period of time to allow a polymeric layer to form on the surface.

Suitably the alkyne compounds used in the method of the invention comprise chains of carbon atoms, including one or more carbon-carbon triple bonds. The chains may be optionally interposed with a heteroatom and may carry substituents including rings and other functional groups. Suitable chains, which may be straight or branched, have from 2 to 50 carbon atoms, more suitably from 6 to 18 carbon atoms. They may be present either in the monomer used as a starting material, or may be created in the monomer on application of the plasma, for example by the ring opening Particularly suitable monomeric organic compounds are those of formula (VIII)

(VIII)

where $R^{24}$ is hydrogen, alkyl, cycloalkyl, haloalkyl or aryl optionally substituted by halo;
$X^1$ is a bond or a bridging group; and
$R^{25}$ is an alkyl, cycloalkyl or aryl group optionally substituted by halogen.

Suitable bridging groups $X^1$ include groups of formulae —(CH$_2$)$_s$—, —CO$_2$(CH$_2$)$_p$—, —(CH$_2$)$_p$—O—(CH$_2$)$_q$—, —(CH$_2$)$_p$N(R$^{26}$)CH$_2$)$_q$—, —(CH$_2$)$_p$N(R$^{26}$)SO$_2$—, where s is 0 or an integer of from 1 to 20, p and q are independently selected from integers of from 1 to 20; and $R^{26}$ is hydrogen, alkyl, cycloalkyl or aryl. Particular alkyl groups for $R^{26}$ include $C_{1-6}$ alkyl, in particular, methyl or ethyl.

Where $R^{24}$ is alkyl or haloalkyl, it is generally preferred to have from 1 to 6 carbon atoms.

Suitable haloalkyl groups for $R^{24}$ include fluoroalkyl groups. The alkyl chains may be straight or branched and may include cyclic moieties. Preferably however $R^{24}$ is hydrogen.

Preferably $R^{25}$ is a haloalkyl, and more preferably a perhaloalkyl group, particularly a perfluoroalkyl group of formula $C_rF_{2r+1}$ where r is an integer of 1 or more, suitably from 1-20, and preferably from 6-12 such as 8 or 10.

In a preferred embodiment, the compound of formula (VIII) is a compound of formula (IX)

(IX)

where s is as defined above and $R^{27}$ is haloalkyl, in particular a perhaloalkyl such as a $C_{6-12}$ perfluoro group like $C_6F_{13}$.

In an alternative preferred embodiment, the compound of formula (VIII) is a compound of formula (X)

where p is an integer of from 1 to 20, and $R^{27}$ is as defined above in relation to formula (IX) above, in particular, a group $C_8F_{17}$—. Preferably in this case, p is an integer of from 1 to 6, most preferably about 2.

Other examples of compounds of formula (I) are compounds of formula (XI)

where p is as defined above, but in particular is 1, q is as defined above but in particular is 1, and $R^{27}$ is as defined in relation to formula (IX), in particular a group $C_6F_{13}$;
or compounds of formula (XII)

where p is as defined above, but in particular is 1, q is as defined above but in particular is 1, $R^{26}$ is as defined above an in particular is hydrogen, and $R^{27}$ is as defined in relation to formula (IX), in particular a group $C_7F_{15}$;
or compounds of formula (XIII)

where p is as defined above, but in particular is 1, $R^{26}$ is as defined above an in particular is ethyl, and $R^{27}$ is as defined in relation to formula (IX), in particular a group $C_8F_{17}$.

In an alternative embodiment, the alkyne monomer used in the process is a compound of formula (XIV)

where $R^{28}$ is hydrogen, alkyl, cycloalkyl, haloalkyl or aryl optionally substituted by halo, $R^{29}$, $R^{30}$ and $R^{31}$ are independently selected from alkyl or alkoxy, in particular $C_{1-6}$ alkyl or alkoxy.

Preferred groups $R^{28}$ are hydrogen or alkyl, in particular $C_{1-6}$ alkyl.

Preferred groups $R^{29}$, $R^{30}$ and $R^{31}$ are $C_{1-6}$ alkoxy in particular ethoxy.

In general, the item to be treated is placed within a plasma chamber together with the material to be deposited in gaseous state, a glow discharge is ignited within the chamber and a suitable voltage is applied, which may be pulsed.

The non-wetting or non-absorbing polymeric coating may be produced under both pulsed and continuous-wave plasma deposition conditions but pulsed plasma is preferred.

As used herein, the expression "in a gaseous state" refers to gases or vapours, either alone or in mixture, as well as aerosols.

Microfabricated devices treated in this way exhibit enhanced non-wetting or non-absorbing properties and may advantageously be used in procedures such as microfluidic procedures to minimise problems associated with adsorption such as reduced sensitivity or even failure.

Precise conditions under which the plasma polymerization takes place in an effective manner will vary depending upon factors such as the nature of the polymer, the microfabricated device or element, component or sub-assembly thereof etc. and will be determined using routine methods and/or the techniques.

Suitable plasmas for use in the method of the invention include non-equilibrium plasmas such as those generated by radiofrequencies (Rf), microwaves or direct current (DC). They may operate at atmospheric or sub-atmospheric pressures as are known in the art. In particular however, they are generated by radiofrequencies (Rf).

Various forms of equipment may be used to generate gaseous plasmas. Generally these comprise containers or plasma chambers in which plasmas may be generated. Particular examples of such equipment are described for instance in WO2005/089961 and WO02/28548, but many other conventional plasma generating apparatus are available.

The gas present within the plasma chamber may comprise a vapour of the monomeric compound alone, but it may be combined with a carrier gas, in particular, an inert gas such as helium or argon, if required. In particular helium is a preferred carrier gas as this can minimise fragmentation of the monomer.

When used as a mixture, the relative amounts of the monomer vapour to carrier gas is suitably determined in accordance with procedures which are conventional in the art. The amount of monomer added will depend to some extent on the nature of the particular monomer being used, the nature of the substrate being treated, the size of the plasma chamber etc. Generally, in the case of conventional chambers, monomer is delivered in an amount of from 50-250 mg/min, for example at a rate of from 100-150 mg/min. It will be appreciated however, that the rate will vary depending on the reactor size chosen and the number of substrates required to be processed at once; this in turn depends on considerations such as the annual through-put required and the capital outlay.

Carrier gas such as helium is suitably administered at a constant rate for example at a rate of from 5-90, for example from 15-30 sccm. In some instances, the ratio of monomer to carrier gas will be in the range of from 100:0 to 1:100, for instance in the range of from 10:0 to 1:100, and in particular about 1:0 to 1:10. The precise ratio selected will be so as to ensure that the flow rate required by the process is achieved.

In some cases, a preliminary continuous power plasma may be struck for example for from 15 seconds to 10 minutes, for example from 2-10 minutes within the chamber. This may act as a surface pre-treatment step, ensuring that the monomer attaches itself readily to the surface, so that as polymerisation occurs, the coating "grows" on the surface. The pre-treatment step may be conducted before monomer is introduced into the chamber, in the presence of only an inert gas.

The plasma is then suitably switched to a pulsed plasma to allow polymerisation to proceed, at least when the monomer is present.

In all cases, a glow discharge is suitably ignited by applying a high frequency voltage, for example at 13.56 MHz. This is applied using electrodes, which may be internal or external to the chamber, but in the case of larger chambers are generally internal.

Suitably the gas, vapour or gas mixture is supplied at a rate of at least 1 standard cubic centimeter per minute (sccm) and preferably in the range of from 1 to 100 sccm.

In the case of the monomer vapour, this is suitably supplied at a rate of from 80-300 mg/minute, for example at about 120 mg per minute depending upon the nature of the monomer, whilst the pulsed voltage is applied. It may however, be more appropriate for industrial scale use to have a fixed total monomer delivery that will vary with respect to the defined process time and will also depend on the nature of the monomer and the technical effect required.

Gases or vapours may be delivered into the plasma chamber using any conventional method. For example, they may be drawn, injected or pumped into the plasma region. In particular, where a plasma chamber is used, gases or vapours may be drawn into the chamber as a result of a reduction in the pressure within the chamber, caused by use of an evacuating pump, or they may be pumped, sprayed, dripped, electrostatically ionised or injected into the chamber as is common in liquid handling.

Polymerisation is suitably effected using vapours of compounds for example of formula (I), which are maintained at pressures of from 0.1 to 400 mtorr, suitably at about 10-100 mtorr.

The applied fields are suitably of power of from 5 to 500 W for example from 20 to 500 W, suitably at about 100 W peak power, applied as a continuous or pulsed field. Where used, pulses are suitably applied in a sequence which yields very low average powers, for example in a sequence in which the ratio of the time on:time off is in the range of from 1:500 to 1:1500. Particular examples of such sequence are sequences where power is on for 20-50 μs, for example about 30 μs, and off for from 1000 μs to 30000 μs, in particular about 20000 μs. Typical average powers obtained in this way are 0.01 W.

The fields are suitably applied from 30 seconds to 90 minutes, preferably from 5 to 60 minutes, depending upon the nature of the compound of formula (I) and the substrate such as the microfabricated device or element, component or sub-assembly thereof.

Suitably a plasma chamber used is of sufficient volume to accommodate multiple microfabricated devices or element, component or sub-assemblies thereof.

A particularly suitable apparatus and method for producing microfabricated devices in accordance with the invention is described in WO2005/089961, the content of which is hereby incorporated by reference.

In particular, when using high volume chambers of this type, the plasma is created with a voltage as a pulsed field, at an average power of from 0.001 to 500 w/m$^3$, for example at from 0.001 to 100 w/m$^3$ and suitably at from 0.005 to 0.5 w/m$^3$.

These conditions are particularly suitable for depositing good quality uniform coatings, in large chambers, for example in chambers where the plasma zone has a volume of greater than 500 cm$^3$, for instance 0.1 m$^3$ or more, such as from 0.5 m$^3$-10 m$^3$ and suitably at about 1 m$^3$. The layers formed in this way have good mechanical strength.

The dimensions of the chamber will be selected so as to accommodate the particular microfabricated device or element, component or sub-assembly being treated. For instance, generally cuboid chambers may be suitable for a wide range of applications, but if necessary, elongate or rectangular chambers may be constructed or indeed cylindrical, or of any other suitable shape.

The chamber may be a sealable container, to allow for batch processes, or it may comprise inlets and outlets for the microfabricated device or element, component or sub-assembly, to allow it to be utilised in a continuous process as an in line system. In particular in the latter case, the pressure conditions necessary for creating a plasma discharge within the chamber are maintained using high volume pumps, as is conventional for example in a device with a "whistling leak". However it will also be possible to process microfabricated devices or elements, components or sub-assemblies at atmospheric pressure, or close to, negating the need for "whistling leaks".

In a further aspect, the invention provides a method for enhancing the free-flowing properties of liquid through a microfluidics or nanofluidics device, said method comprising using a microfluidics or nanofluidics device wherein at least the surfaces which contact a liquid, such as the internal surfaces of the channels or wells, comprise a non-wetting or non-absorbing polymeric coating or surface modification formed by ionisation or activation techniques such as plasma processing and have a surface energy of less than 15 mNm$^{-1}$.

Suitably, the microfluidics or nanofluidics device or sub assembly is placed in a plasma deposition chamber, a glow discharge is ignited within said chamber, and a voltage applied as a pulsed field.

Suitable monomers and reaction conditions for use in this method are as described above.

EXAMPLE 1

A fully constructed microfluidics device comprising a series of wells interconnected by a range of channels on a transparent substrate is placed into a plasma chamber with a processing volume of ~300 liters. The chamber is connected to supplies of the required gases and or vapours, via a mass flow controller and/or liquid mass flow meter and a mixing injector or monomer reservoir as appropriate.

The chamber is evacuated to between 3-10 mtorr base pressure before allowing helium into the chamber at 20 sccm until a pressure of 80 mtorr is reached. A continuous power plasma is then struck for 4 minutes using RF at 13.56 MHz at 300 W.

After this period, 1H,1H,2H,2H-heptadecafluorodecylacylate (CAS #27905-45-9) of formula:

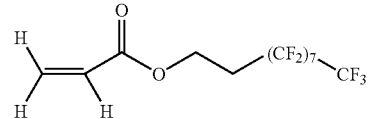

is brought into the chamber at a rate of 120 milli grams per minute and the plasma is switched to a pulsed plasma at 30 micro seconds on-time and 20 milli seconds off-time at a peak power of 100 W for 40 minutes. On completion of the 40 minutes the plasma power is turned off along with the processing gases and vapours and the chamber is evacuated back down to base pressure. The chamber is then vented to atmospheric pressure and the device is removed.

The device including the channels and wells is covered with a non-wetting or non-absorbing polymer layer which prevents liquid being adsorbed onto the surface, thereby enhancing the free-flowing properties of liquid sample through the device.

Devices obtained in this way are used in a kinetic assay of enzyme activity using a fluorescent signaling system as is conventional in the art. A similar assay is carried out on a bulk sample, using similar methodology. The results of multiple assays show comparable performance. Interfacial and evaporation problems are avoided in the miniaturized version.

A fluorescent enzyme inhibition assay is also conducted in both bulk procedures and miniaturized devices prepared as described above. Again comparable results are obtained in both the bulk and miniaturized devices.

It is clear that the results obtained using microfluidics devices prepared as described above will provide reliable and accurate results.

The invention claimed is:
1. A microfluidic device comprising:
   at least one chamber or tunnel or channel for the containment or flow of at least one fluid, said chamber or tunnel or channel having at least one dimension less than 1 mm and said chamber or tunnel or channel defining one or more surfaces for the containment or flow of the fluid, wherein the entire surfaces of the microfluidic device which, in use, would come into contact with the fluid are provided with a uniform non-wetting or non-absorbing polymeric coating or surface modification formed by plasma processing, and wherein the entire surfaces of the microfluidic device which, in use, would come into contact with the fluid have a surface energy value of less than 15 mNm$^{-1}$.

2. The microfluidic device according to claim 1 wherein the coating or surface modification comprises a non-wetting or non-absorbing polymer formed by plasma polymerization of a monomeric compound, and wherein the surface of the device or an element, component or sub-assembly thereof is exposed to the plasma for a sufficient period of time for a uniform layer of the polymer to form on the surface.

3. The microfluidic device according to claim 2 wherein the monomeric compound is a compound of formula (I):

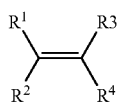
(I)

where $R^1$, $R^2$ and $R^3$ are independently selected from hydrogen, alkyl, haloalkyl or aryl optionally substituted by halo; and $R^4$ is a group —X—$R^5$ where $R^5$ is an alkyl or haloalkyl group and X is a bond; a group of formula —C(O)O—, a group of formula —C(O)O(CH$_2$)$_n$Y— where n is an integer of 1 to 10 and Y is a sulphonamide group; or a group —(O)$_p$R$^6$(O)$_q$(CH$_2$)$_t$— where $R^6$ is aryl optionally substituted by halo, p is 0 or 1, q is 0 or 1 and t is 0 or an integer of 1 to 10, provided that where q is 1, t is other than 0.

4. The microfluidic device according to claim 3 wherein the compound of formula (I) is a compound of formula (II):

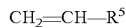
(II)

where $R^5$ is an alkyl or haloalkyl group, or a compound of formula (III):

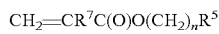
(III)

where n is an integer of 1 to 10 and $R^5$ is an alkyl or haloalkyl group and $R^7$ is hydrogen, C$_{1-10}$alkyl, or C$_{1-10}$haloalkyl.

5. The microfluidic device according to claim 4 wherein the compound of formula (I) is a compound of formula (III).

6. The microfluidic device according to claim 5 wherein the compound of formula (III) is a compound of formula (IV):

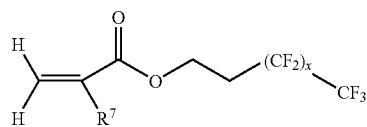
(IV)

where $R^7$ is hydrogen, C$_{1-10}$ alkyl, or C$_{1-10}$ haloalkyl, and x is an integer of 1 to 9.

7. The microfluidic device according to claim 6 wherein the compound of formula (IV) is 1H,1H,2H,2H-heptadecafluorodecylacrylate.

8. The microfluidic device according to claim 2 wherein the monomeric compound is a compound of formula (V):

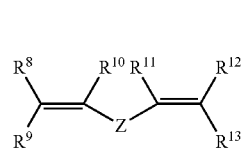
(V)

where $R^8$, $R^9$, $R^{10}$, $R^{11}$, $R^{12}$, and $R^{13}$ are all independently selected from hydrogen, halo, alkyl, haloalkyl or aryl optionally substituted by halo; and Z is a bridging group.

9. The microfluidic device according to claim 2 wherein the monomeric compound is a compound of formula (VII):

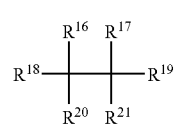
(VII)

where $R^{16}$, $R^{17}$, $R^{18}$, $R^{19}$ and $R^{20}$ are independently selected from hydrogen, halogen, alkyl, haloalkyl or aryl optionally substituted by halo; and $R^{21}$ is a group X—$R^{22}$ where $R^{22}$ is an alkyl or haloalkyl group and X is a bond; a group of formula —C(O)O(CH$_2$)$_x$Y— where x is an integer of 1 to 10 and Y is a bond or a sulphonamide group; or a group —(O)$_p$R$^{23}$(O)$_s$(CH$_2$)$_t$— where $R^{23}$ is aryl optionally substituted by halo, p is 0 or 1, s is 0 or 1 and t is 0 or an integer of 1 to 10, provided that where s is 1, t is other than 0.

10. The microfluidic device according to claim 2 wherein the monomeric compound is a compound of formula (VIII):

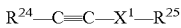
(VIII)

where $R^{24}$ is hydrogen, alkyl, cycloalkyl, haloalkyl or aryl optionally substituted by halo;

$X^1$ is a bond or a bridging group; and $R^{25}$ is an alkyl, cycloalkyl or aryl group optionally substituted by halogen.

11. The microfluidic device according to claim 1, wherein the surfaces of the chambers, tunnels or channels have an ultra low surface energy less that 12 mNm$^{-1}$.

12. The microfluidic device according to claim 1, wherein the surfaces of the chambers, tunnels or channels have an ultra low surface energy in the range of 8 to 10 mNm$^{-1}$.

13. The microfluidic device according to claim 11, wherein the surfaces of the chambers, tunnels or channels have an ultra low surface energy in the range of 8 to 10 mNm$^{-1}$.

14. The microfluidic device according to claim 1, wherein the entire surface of the microfluidic device is provided with the uniform non-wetting polymeric coating or surface modification.

15. The microfluidic device according to claim 11, wherein the entire surface of the microfluidic device is provided with the uniform non-wetting polymeric coating or surface modification.

16. The microfluidic device according to claim 12, wherein the entire surface of the microfluidic device is provided with the uniform non-wetting polymeric coating or surface modification.

17. The microfluidic device according to claim 13, wherein the entire surface of the microfluidic device is provided with the uniform non-wetting polymeric coating or surface modification.

18. The microfluidic device according to claim 1, wherein the chamber, tunnel or channel has at least one dimension less than 100 nanometers.

19. The microfluidic device according to claim 11, wherein the chamber, tunnel or channel has at least one dimension less than 100 nanometers.

20. The microfluidic device according to claim 12, wherein the chamber, tunnel or channel has at least one dimension less than 100 nanometers.

* * * * *